G. G. EARL.
AUTOMATIC CONTROLLING OR REGULATING APPARATUS.
APPLICATION FILED JUNE 7, 1915.

1,240,325.

Patented Sept. 18, 1917.
3 SHEETS—SHEET 1.

Inventor
George G. Earl.
H O. Richey
His Attorney

G. G. EARL.
AUTOMATIC CONTROLLING OR REGULATING APPARATUS.
APPLICATION FILED JUNE 7, 1915.
1,240,325.
Patented Sept. 18, 1917.
3 SHEETS—SHEET 2.
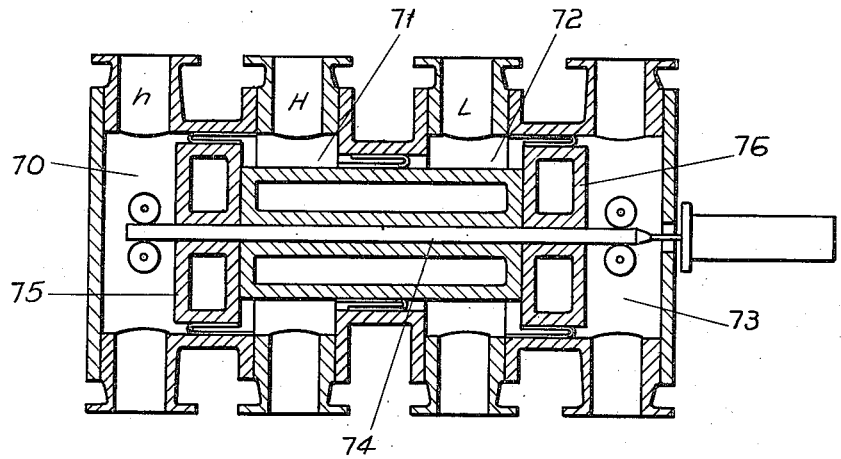
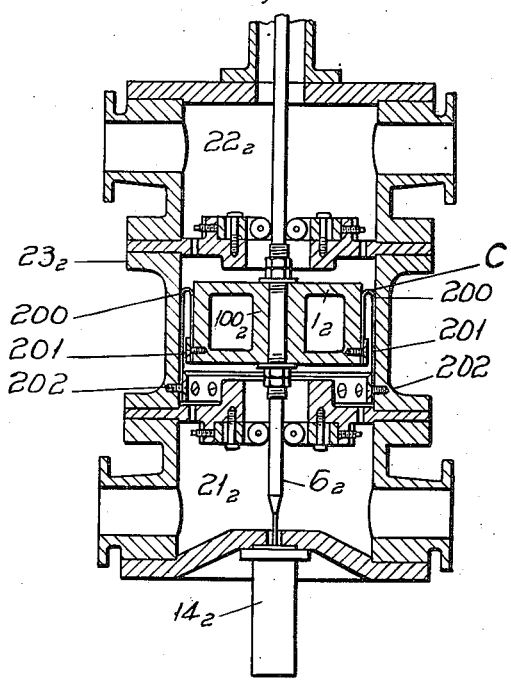
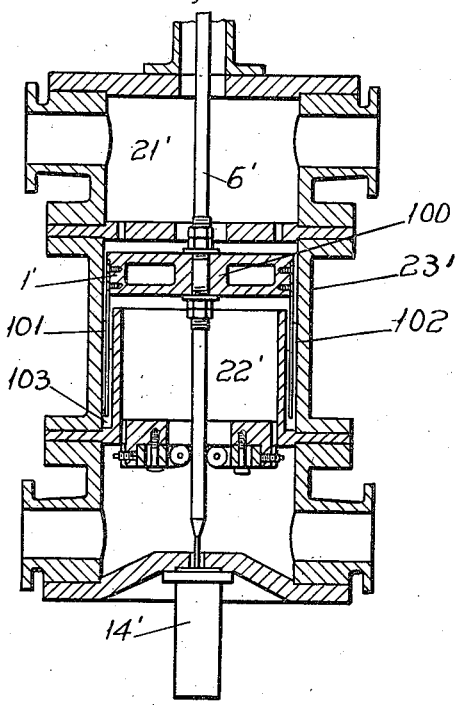
Inventor
George G. Earl.
By J. O. Richey
His Attorney.

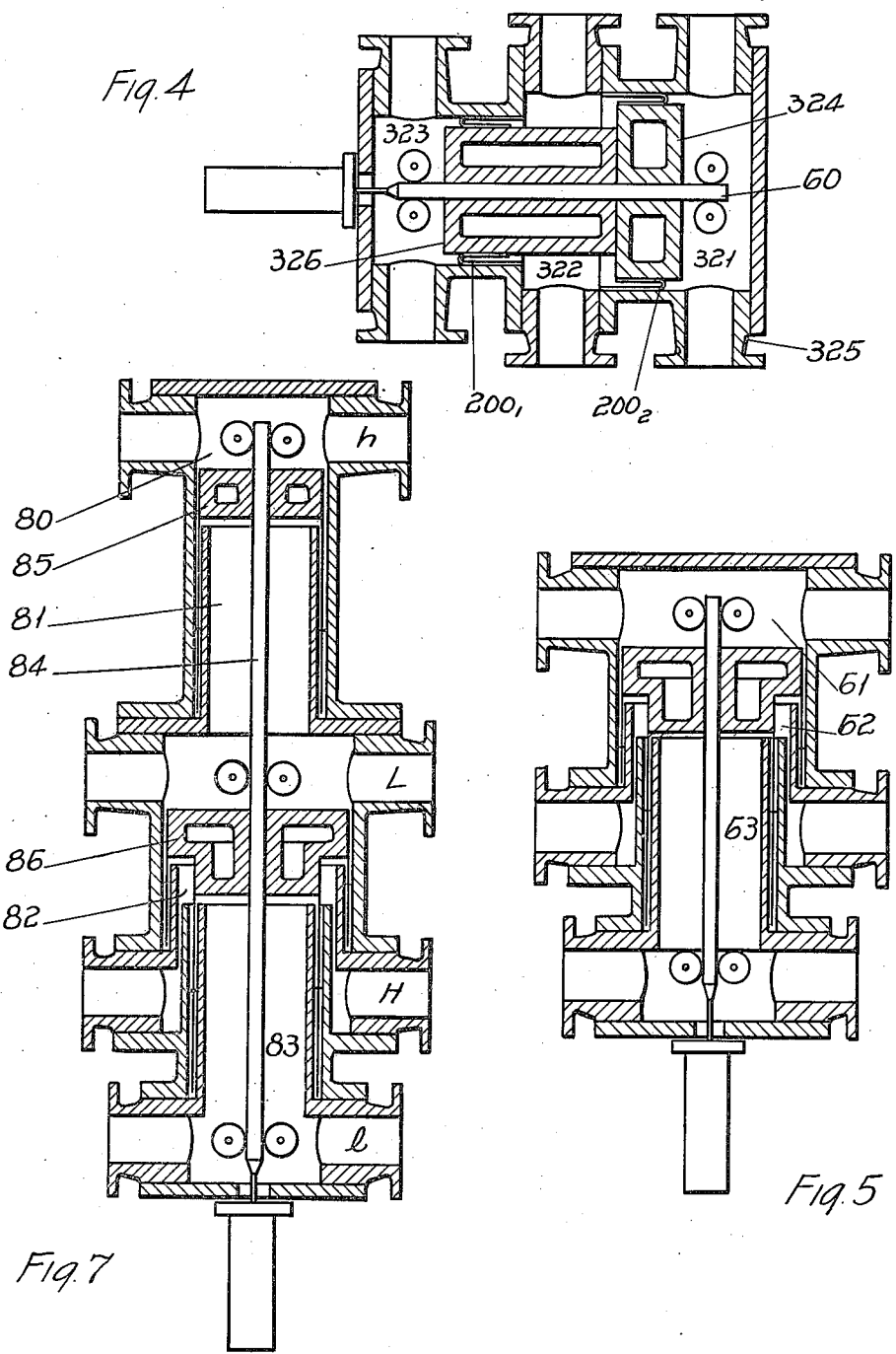

UNITED STATES PATENT OFFICE.

GEORGE GOODELL EARL, OF NEW ORLEANS, LOUISIANA.

AUTOMATIC CONTROLLING OR REGULATING APPARATUS.

1,240,325.  Specification of Letters Patent.  Patented Sept. 18, 1917.

Application filed June 7, 1915. Serial No. 32,725.

*To all whom it may concern:*

Be it known that I, GEORGE G. EARL, a citizen of the United States, residing in New Orleans, in the parish of Orleans and State of Louisiana, have invented certain new and useful Improvements in Automatic Controlling or Regulating Apparatus; and I do hereby declare the following to be a full, clear, and exact description of the invention, such as will enable others skilled in the art to which it appertains to make and use the same.

My invention relates to regulating apparatus for hydraulic systems, such as may be used for hydraulic systems in which apparatus is employed for regulating one fluid flow or pressure by another fluid flow or pressure, or system of flows or pressures. More particularly still, my invention may be used with apparatus where a fluid pressure or flow, or system of fluid pressures and flows is employed to control other flows or pressures, so that the latter will be functional or substantially functional to the former.

Hitherto, so far as I am aware, efforts have been made to secure suitable apparatus for accomplishing the functions which I have set forth, but such systems have been open to certain objections. First, systems of weights and levers have been employed, and while successful in performing these functions, have occupied too much space and have otherwise been inconvenient for various reasons. Efforts have been made to employ pistons, but owing to the friction of such devices, the mechanisms in which they have been employed have not been sufficiently accurate for the desired purposes. Flexible diaphragms connected to the walls of the chambers in which they are mounted have also been employed, but these have been inaccurate and unsuitable, except for limited purposes, because when deflected, the area of the diaphragm is varied and because a varying part of the force which is to be transmitted to the thrust member is transmitted through the edges of the diaphragm to the walls of the chamber and wasted, such errors being accentuated the more the diaphragm is deflected from its normal position. Owing to these faults, such diaphragms are of limited utility and unsuccessful where the use requires that they should be deflected for any considerable distances beyond their normal positions, or loaded to balance at a given pressure difference, or opposed to one another.

One of the objects of my invention is to provide improvements in such apparatus as I have named, which will obviate all of the difficulties which I have mentioned. I provide fluid-tight means which is compact and capable of moving for considerable distances without dissipating the energy transmitted to it, and without changing its area.

Another object of my invention is to provide, operating in harmony, a plurality of such devices for the purposes of regulating or controlling fluid flows or pressures more accurately. I also aim to provide means which will accurately regulate and control such flows or pressures, even for slight pressures or flows.

Other objects of my invention and the invention itself will be made more clear from descriptions of specific embodiments of the same, illustrated in the drawings.

Figure 1 shows one embodiment of my invention incorporated in a system which will serve to illustrate in a general way the utility, as well as the objects of my invention, Fig. 2 is a single piston, two pressure set of similar construction of piston to Fig. 1, which may be balanced to maintain the pressure on one side of it either equal to or any constant amount greater or less than a varying fluid pressure on its opposite side.

Fig. 3 is a modification of Fig. 2.

Fig. 4 is a modification showing the adaptability of my invention where four pressures are required to be used.

Fig. 5 is a modification of the device shown in Fig. 4.

Fig. 6 is another modification.

Fig. 7 is another modification.

Figure 1:
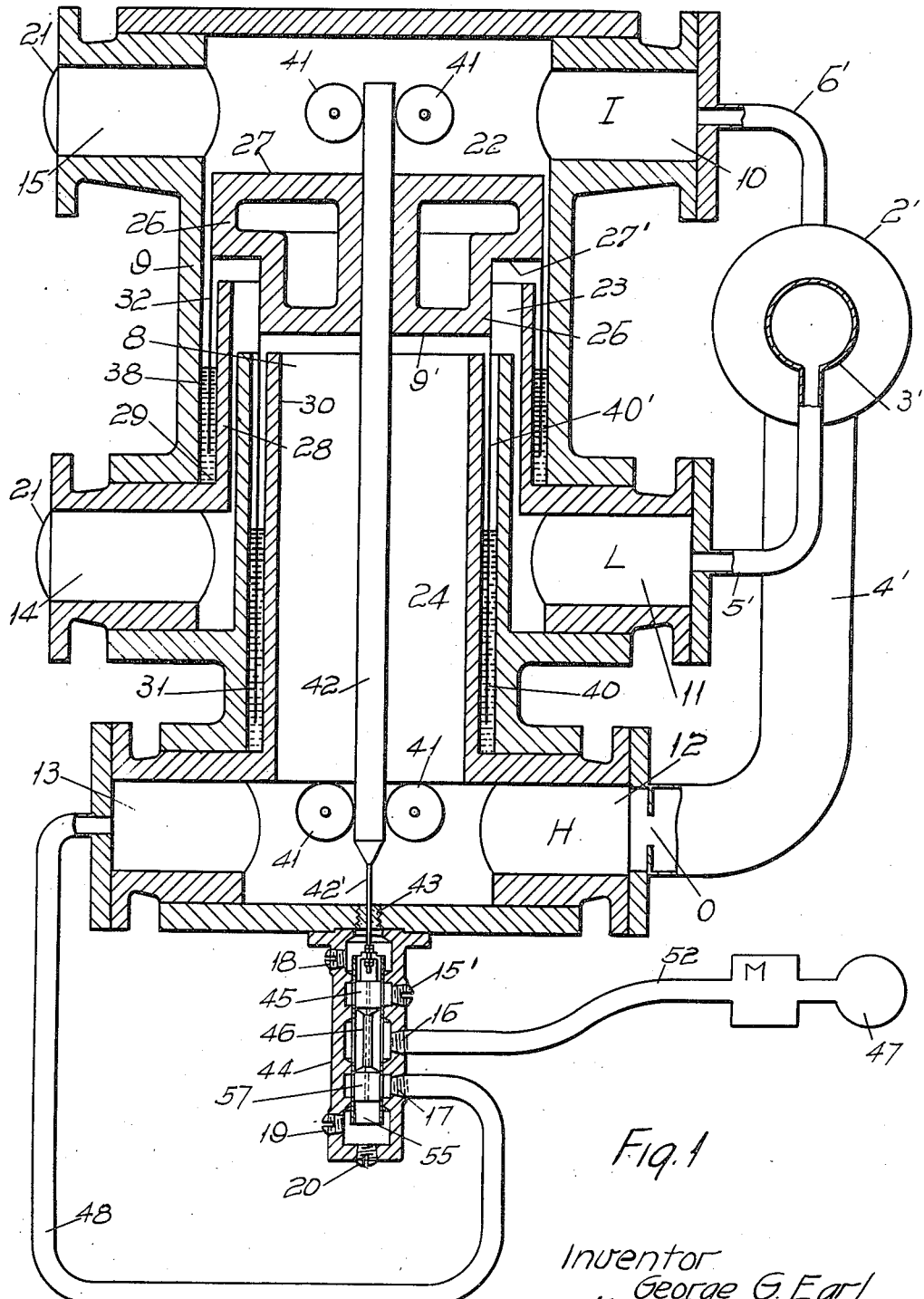

Referring now to the drawing, and first to the embodiment illustrated in Fig. 1, at 8 is shown a chamber which may be formed by the walls 9, said walls being provided with a plurality of openings 10, 11, 12, 13, 14 and 15. In the form shown, the openings 14 and 15 are closed with plugs 21. The chamber is divided into a plurality of cells 22, 23 and 24. The cells are partitioned off by a movable member 26, one side of which is here shown as having two sections, the section 27' being greater in area than the section 9'. The other side is shown at 27. One of the chamber walls is shown as provided with a collar 28, forming a channel 29 between the collar 28 and the wall 9 of the chamber. A second collar 30 forms a channel 31 between the collar 30 and the wall of the chamber. A fin 32, annular in form, is connected preferably to the periphery of 26 and extends into the channel 29. A quantity of fluid is shown at 38 in this channel. This fluid may be mercury. Through this means the member 26 can move in the chamber without variations in its area and substantially without friction, and certainly without transmitting any force to the walls of the chamber. Likewise, a second fin is shown at 40', and in the channel 31 a second quantity of fluid is shown at 40 for the same purposes.

Guides 41 are provided for the rod 42 to which 26 is connected. An extension of this rod, shown at 42', passes through an opening 43 in the wall of the chamber and controls a valve 46, shown in the valve casing 44. In the particular form of valve shown, a tube 55 is mounted in the casing and the valve is spool-shaped, the ends 45 and 57 being larger in area than the spindle 46. The valve casing is provided with a plurality of openings 15', 16, 17, 18, 19 and 20. In the form shown the openings 15', 18, 19 and 20 are closed with plugs. A duct 52 leads from a source of pressure 47 to the opening 16 and another duct 48 connects the valve casing through the opening 17 to the opening 13 in the chamber 24. A fluid main is shown at 2', through which fluid flows under pressure from a suitable pressure source. At 3' there is shown a reduced section of such main; at 4' a duct leading from the full section of the main to the opening 12 in the chamber. A duct 5' leads from the reduced section 3' of the main to the opening 11 in the casing and a duct 6' leads from the full section of the main 2' to the chamber 22. As will be seen, fluid pressure in the main will be transmitted from the full section thereof to the cell 22 and bear upon the full area 27 of the member 26. Pressure will be transmitted through the duct 5' from the reduced section of the main to the cell 23 and bear upon the portion of the area of the piston, shown at 27'. Pressure will be transmitted from the full section of the main through the duct 4' to the cell 24 and bear against the section 9' of the member 26. Pressure from the source 47 will be transmitted through the duct 52, the valve and the valve casing 44 to the cell 24 and also bear against the section 9' of the member 26, when the ducts 48 and 52 are connected together by the valve. When these pressures are in equilibrium, there will be movement of neither the device 26 nor of the valve, so that assuming that 52 and 48 are connected together, the fluid flowing through the duct 48 will be constant. If, however, this equilibrium is disturbed by a change of pressure in one of the cells, for example, due to the change in velocity of the fluid in the main, the system will be unbalanced, the valve will open wider or throttle the flow from the source 47 and thereby reduce or increase the pressure from such source upon the member 27, automatically causing the apparatus to again be placed in a state of equilibrium.

During these operations, it will be seen, that owing to the arrangements which I have provided for associating the member 26 with the walls of the chamber, none of the energy will be dissipated through friction, nor will the areas of the member 26 exposed to these pressures be changed. It will also be seen that the pressure in the chamber 24 plus the pressure in the chamber 23, divided by some constant, will be equal to the pressure in the chamber 22. This constant will depend upon the relative areas of the movable member acted upon by the pressure in chambers 23 and 24. By this arrangement I am enabled to regulate fluid flow and pressures in such a way that accuracy will be maintained even for slight variations in pressures and flows.

In this particular use of this invention, the object is to regulate a flow from the source of higher pressure 47 that will create a static pressure acting on the orifice O, which is as much higher than the static pressure in the approach 2' to the venturi 2'—3' as is the static pressure in the throat 3' of said venturi lower than the static pressure at the approach to said venturi. In order to do this, the lower side of the piston 27 is divided into two areas to be acted upon, respectively, by the pressures in chambers 23 and 24, and the movable member as a whole, when in water, is of such flotation value or so balanced that it will tend neither to rise nor fall when the pressures acting in chambers 22, 23 and 24 are equal. By the above described action we have a flow from a source of higher pressure introduced at the approach to a venturi and maintained proportional to the flow therein, and a meter M measuring said introduced flow can measure the flow in the venturi.

In the form illustrated in Fig. 2 the chamber is shown at 23', the cells at 21' and 22'. The movable member adapted to transmit the pressure is shown at 1' and the rod is shown at 6' connected to the valve 14'. In this embodiment the movable member consists of a piston 100 to which is connected a fin 101 working in a compartment 102. The piston and fin form a cup-shaped member with the sides of the cup extending into the compartment. Both the fin 101 and the compartment 102 are annular in shape, and the fin is adapted to reciprocate in the compartment 102. This compartment is sealed at 103 by some suitable sealing material, such as a quantity of mercury, serving to separate the pressure cells and prevent fluid flowing from one to another. In the operation, the piston with the fin is moved up and down, the end of the fin remaining in the sealing material, preventing communication between the cells during the movement of the member 1', but at the same time permitting a frictionless, unrestrained motion.

In the form shown in Fig. 3, the chamber is shown at $23_2$ and the cells illustrated at $22_2$ and $21_2$. The rod is shown at $6_2$ and the valve at $14_2$. The movable member is shown at $1_2$, consisting of a piston $100_2$ connected to the walls of the chamber by a flexible member 200. This member is connected at one end to the piston by any suitable means, such as a ring held in place by screws 201 and to the wall of the chamber by suitable means, such as a ring held in place by screws 202. The member 200 extends around the chamber and separates the cells, but permits the piston $100_2$ to move upon a finite range without restraint from the chamber walls, without causing a variation in the area of the piston acted upon by the pressure in the cells, because the annular U-shaped diaphragm is confined between the walls of the containing cylinder and the sides of the cylindrical piston for the entire required length of motion of the piston and the point of contraflexure of the curve C at the end of the U-shaped diaphragm, which defines the limit of area of the piston $100_2$ reacting against the movable member, must remain midway between the piston and the piston chamber.

Fig. 4 is a modification of the form shown in Fig. 3, in which there are three cells 321, 322 and 323. The cells 321 and 322 are separated by a piston 324 associated with the walls of the chamber 325 by a flexible member $200_2$ and the cells 322 and 323 are separated by a piston 326 associated with the walls of the chamber by a diaphragm $200_1$. Both pistons are connected to the rod 60.

Fig. 5 is a modification showing three cells 61, 62 and 63 separated by fins and sealed compartments, as illustrated in the modification shown in Fig. 2.

Fig. 6 shows a modification in which there are four cells, shown at 70, 71, 72 and 73 separated in the manner illustrated in the modification shown in Fig. 3. The rod is shown at 74 and pistons 75 and 76 connected to said rod, said pistons being exposed to the pressure in the cells with which they are associated, and transmitting such pressure to the rod, which is moved in proportion to the resultant of said pressure.

Fig. 7 illustrates a modification showing four cells 80, 81, 82 and 83 separated in the manner illustrated in Fig. 2. The rod is shown at 84 and is connected to the pistons 85 and 86 to which the pressures in the cells are transmitted in the manner previously described and now understood.

It will thus be seen that I have provided means for regulating fluid flows and pressures, eliminating the inconvenience and inaccuracy of apparatus previously employed for this purpose, my apparatus being compact, substantial and for all practical reasons, frictionless, providing and exposing to said pressures a constant and unvarying area and avoiding pressure transmitting connecting means through stuffing boxes. At the same time, I have provided means which is capable of moving through finite ranges, capable of separating the end pressures actuating upon the opposite sides thereof, and of accurately transmitting the resultant of such pressures.

Any of these sets may be designed and balanced for any desired initial condition, and will thereafter change one or more of the fluid pressures in one or more of their pressure cells in definite and accurate functional relation with independent changes in fluid pressure in one or more other of their cells. For instance, a single piston, two cell set can maintain one fluid pressure equal to another fluid pressure plus or minus any desired constant, which constant may be zero. A double piston, three cell set can maintain a relation in which a high pressure and a low pressure divided by any desired constant shall equal the difference between an intermediate and said low pressure, plus or minus another constant, which last constant may be zero. A three piston, four cell set can maintain the difference between one pair of pressures equal to the difference between another pair of pressures multiplied by any constant, which constant may be unity. All of these sets maintain a constant area acted upon by the pressures in the pressure cells throughout the necessary range of motion.

I have illustrated several modifications of my invention for the purpose of better describing the same. At the same time, it will be understood that many departures may be made from the forms illustrated and from their details, without departing from the spirit of the invention, said invention being set forth in the appended claims.

I claim:—

1. In a device of the class described, the combination of a plurality of fluid pressure cells provided with openings in the walls for the admission of fluid under pressure, movable means between said cells exposed to the pressures therein, guiding means for said movable means, flexible means connected to said movable means and separating said cells, and a valve and valve stem controlled by said movable means.

2. In a device of the class described, the combination of a fluid chamber having openings in the walls thereof for the admission of fluid under pressure to said chamber, flexible means separating said chamber into two pressure cells, a movable member connected to said flexible means and movable in response to the variations in pressure in said cells, guiding means for said movable means and means including a valve and valve stem controlled by said member.

3. In a device of the class described, the combination of a fluid chamber provided with openings to admit fluid under pressure thereto, a partition dividing said chamber into pressure cells and a freely movable member connected to said partition and responsive to the variations in fluid pressure in said cells, guiding means for said movable means and means including a valve and valve stem controlled by said member.

4. In a device of the class described, the combination of a fluid chamber, a plurality of movable divisions therein, fluid-tight as against the inter-mixture of fluids whose pressures are to be retained thereby, dividing said chamber into a plurality of fluid pressure cells adapted to receive and transmit opposing pressures for the required amount of motion, means to cause the pressures to vary in one or more of said cells, a source of fluid pressure and an outlet for fluid flow of adequate high and low pressure range, a passage-way from said source to said outlet, connections from said passage-way to one or more other of said fluid pressure cells and a valve in said passage-way operated by said movable member.

5. In a device of the class described, the combination of a fluid pressure chamber provided with openings to admit fluid under pressure, means to divide said chamber into two pressure cells, including a movable member and flexible connecting means between said member and the walls of the chamber, said member being movable in response to the variations in fluid pressure in said chamber and fluid regulating means controlled by said member.

6. In a device of the class described, the combination of a pressure chamber having openings therein to admit fluid under pressure, a movable member in said chamber, flexible means connecting said member to the walls of said chamber, said member and said flexible means dividing said chamber into two pressure cells, said member being exposed to the fluid pressures in said cells and movable in response to variations therein, and fluid regulating means controlled by said member.

7. In a device of the class described, the combination of two fluid pressure cells, a movable member between said cells exposed to and responding to the fluid pressures therein, supporting means for said movable member, flexible connecting means connecting said member to the walls of the cells, said member and said flexible means separating said cells one from the other and fluid regulating means controlled by said movable member.

8. In a device of the class described, the combination of a fluid chamber, a plurality of movable divisions therein, fluid-tight as against the inter-mixture of fluids whose pressures are to be retained thereby, dividing said chamber into a plurality of fluid pressure cells and adapted to receive and transmit opposing pressures over definite and constant areas for the required amount of motion, means to cause the pressures to vary in one or more of said cells, a source of fluid pressure and an outlet for fluid flow of adequate high and low pressure range, a passage-way from said source to said outlet, connections from said passage-way to one or more other of said fluid pressure cells and a valve in said passage-way operated by said movable member.

9. In a device of the class described, the combination of a fluid pressure chamber, means to divide said chamber into two pressure cells including a movable member and flexible means connecting said movable member to the walls of said chamber, means to admit fluid under pressure to said cells, said movable member being exposed to the pressure of the fluid in said cells, guiding means for said member permitting the movements thereof and fluid regulating mechanism controlled by said movable member.

10. In a device of the class described, the combination of two pressure cells, means to admit fluid under pressure to said cells, a fluid-tight partition between said cells including a movable member, and flexible means connecting said member to the walls of the cells, said member being exposed to the fluid in said cells and movable in response to the variations in pressure of the fluid in said cells, said member being of constant area and freely movable, friction reducing means for supporting said member independently of said flexible means, said guiding means permitting said member to move freely in response to the variations in such pressures and fluid regulating mechanism controlled by said movable member.

11. In a device of the class described, the combination of several pressure cells, fluid-tight means to separate the first of said cells from a second of said cells, said means including a movable member and flexible means connecting said movable member to the walls of said cells, fluid-tight means for separating the second of said cells from another of said cells, including a second movable member and second flexible means to connect the same to the walls of the cells, fluid regulating mechanism and means to connect each of said movable members to said fluid regulating mechanism.

12. In a device of the class described, the combination of a pair of pressure cells, means to admit fluid under pressure to each of said cells, fluid-tight movable means separating said cells one from the other, said means being movable in response to the variations in the fluid pressures in said cells, means for connecting said movable means to the walls of the cells, guiding apparatus for said means independent of said connecting means, and fluid regulating apparatus controlled by said movable means.

13. In a device of the class described, the combination of a pair of fluid pressure cells, means for admitting fluid under pressure to said cells, a movable partition between said cells moving in response to variations in pressures in said cells, means to connect the edges of the partition to the walls of the cells to prevent fluid from flowing from one cell to another, means for guiding said movable partition independently of said connecting means and fluid regulating means controlled by said movable partition.

14. In a hydraulic system, the combination of a fluid pressure chamber, movable means separating said chamber into three pressure cells, a source of pressure, means to connect said source to two of said cells, a second source of pressure, means to connect said second named source to one of the cells to which the first named source is connected, a third source of pressure, means to connect said third source to the third cell and apparatus including a valve controlled by the movable means for regulating the means for connecting the second source of pressure to the cell to which it is connected.

15. In a hydraulic system, the combination of a fluid pressure chamber, movable means in said chamber acted upon by the fluid pressures therein, said means dividing said chamber into three pressure cells, a source of pressure connected to a first and second of said cells, a second source connected to the other of said cells, a third source of pressure, a duct connecting the third source to one of the cells to which the first source is connected, and apparatus controlled by said movable means over said duct for maintaining the pressures in the cells to which the first-named source is connected proportional to the pressure in the other cell.

16. In a hydraulic system, the combination of a plurality of pressure cells, movable means acted upon by the pressure in said cells and movable in response to variations in pressure therein, a source of pressure connected to the first of said cells, a second source of pressure connected to the other of said cells, a third source connected to one of the last mentioned cells and apparatus controlled by the movable member for maintaining the pressure in one of said cells proportional to the pressures in the other cells.

17. In a hydraulic system, the combination of several pressure cells, movable means acted upon by the pressure in each cell and movable in response to variations in the pressures in said cells, a plurality of sources of fluid pressure, means to transmit fluid pressure from said sources to said cells and apparatus controlled by said movable means for maintaining the pressure in one of said cells proportional to the sum of the pressures in the other of said cells.

18. In a hydraulic system, the combination of a fluid chamber, movable means separating said chamber into several pressure cells, said movable means being acted upon by the pressures in said cells and being movable in response to variations in pressure in said cells, sources of fluid pressure connected to said chamber and apparatus controlled by said movable means for maintaining the pressure in one of said cells proportional to the sum of the pressures in the other cells.

19. In a hydraulic system, the combination of movable means, a source of pressure acting to move said means in two directions, a second source acting to move said means in one direction only, a third source acting to move said means in one direction only and apparatus controlled by said movable means for maintaining the pressures on its two sides proportional to each other.

20. In a hydraulic system, the combination of movable means, a source of pressure, apparatus to transmit pressure from said source to both sides of said means, a plurality of other sources of pressure, apparatus to transmit pressure from said last mentioned sources to one side of said means and mechanism including a valve controlled by said means for maintaining the pressures on the two sides of said means proportional to each other.

21. In a hydraulic system, the combination of a plurality of pressure cells, movable means acted upon by the pressures in said cells, a source of pressure connected with a first cell, said pressure acting upon one side of said means, said source being connected to a second of said cells, a second source connected to a third cell, a third source connected to the second cell and apparatus controlled by said means for maintaining the sum of the pressures in the second and third cells proportional to the pressure in the first cell.

22. In a hydraulic system, the combination of a fluid pressure cell, movable means acted upon by the fluid pressure therein, a plurality of other fluid pressure cells, said movable means being acted upon by the pressure in the other cells, the area of the movable means acted upon by the pressure in the first named cell being equal to the areas thereof acted upon by the pressures in the other cells, and apparatus controlled by the movable member for maintaining the pressure in the first cell proportional to the sum of the pressures in the other cells.

23. In a hydraulic system, the combination with movable means acted upon and movable in response to pressures acting upon its different sides, a source of pressure connected to act upon one side of said means, a plurality of sources of pressures acting upon different parts of the other side of said means, the area of said means acted upon by the first pressure being equal to the areas of the parts acted upon by the other pressures and apparatus controlled by the movable means for maintaining the pressure on one side of said means proportional to the sum of the pressures on the other sides thereof.

In witness whereof, I have signed my name this 24th day of May, 1915.

GEORGE GOODELL EARL.